United States Patent [19]

Skirvin

[11] Patent Number: 4,746,123
[45] Date of Patent: May 24, 1988

[54] METHOD FOR SCRAMBLING AND UNSCRAMBLING ILLUSTRATIONS/A PUZZLE DRAWING GAME

[76] Inventor: Jack E. Skirvin, 317 E. Tenth St., Bloomington, Ind. 47401

[21] Appl. No.: 13,636

[22] Filed: Feb. 11, 1987

[51] Int. Cl.⁴ .......................... A63F 9/06; G09B 11/04
[52] U.S. Cl. ..................................... 273/153 R; 434/88
[58] Field of Search ............ 273/155, 153 R; 434/87, 434/88

[56] References Cited

U.S. PATENT DOCUMENTS

| | | | |
|---|---|---|---|
| 1,552,406 | 9/1925 | Akerbladh | 273/155 U X |
| 3,364,598 | 1/1968 | Cook | 434/87 X |
| 3,633,286 | 1/1972 | Maurer | 434/87 |
| 3,696,529 | 10/1972 | Mabbutt | 434/87 |
| 4,205,849 | 6/1980 | Perkins | 434/87 |

Primary Examiner—Anton O. Oechsle

[57] ABSTRACT

This application discloses a method for scrambling and unscrambling illustrations to form the basis of a puzzle, drawing game. The method also includes the scrambling and unscrambling of titles, names, captions, letters, and other visual matter which may be appropriate for use in conjunction with specific illustrations. The apparatus for carrying out the method's scrambling and unscrambling process is also described.

1 Claim, 2 Drawing Sheets

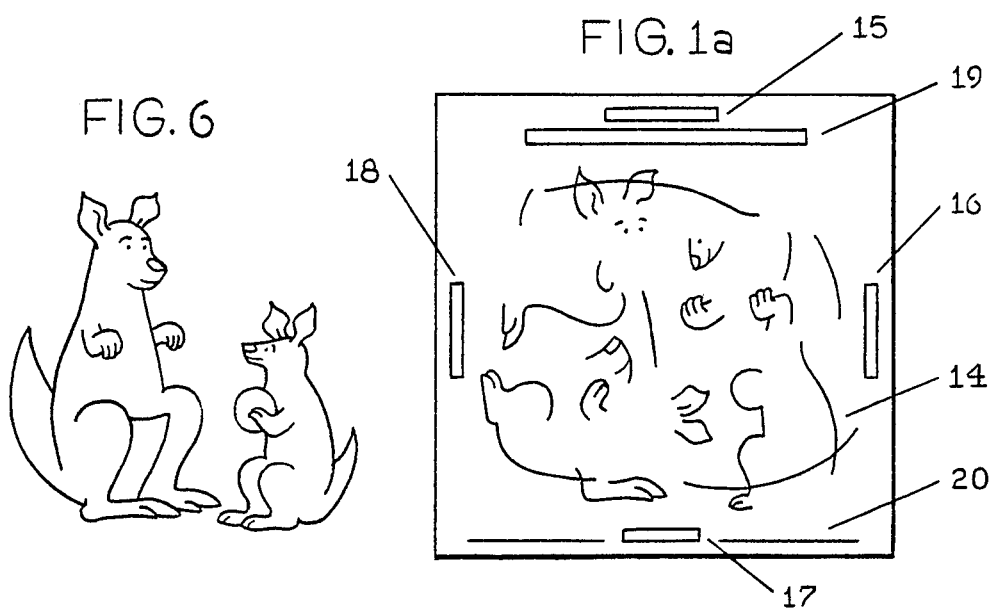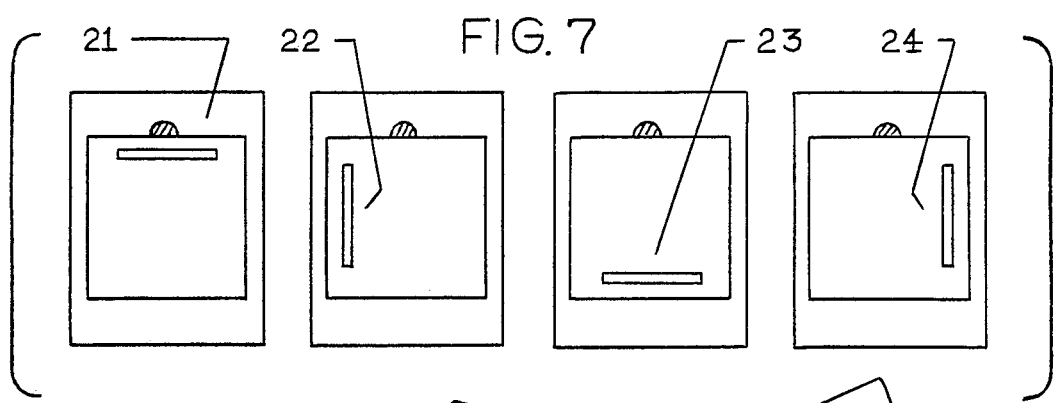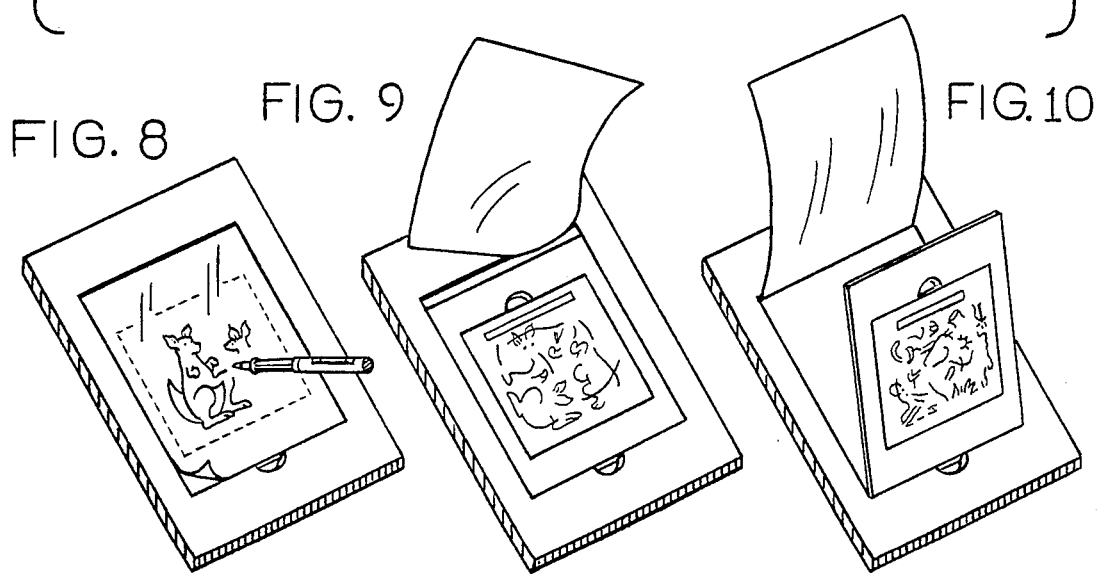

METHOD FOR SCRAMBLING AND UNSCRAMBLING ILLUSTRATIONS/A PUZZLE DRAWING GAME

SUMMARY OF THE INVENTION

This invention is the method for scrambling and unscrambling illustrations and the apparatus developed for carrying out this process. The method for scrambling and unscrambling would also include titles, names, captions, letters, numbers, and other visual matter relating to specific illustrations and which would be deemed appropriate. This invention was created and developed to be a puzzle, drawing game for the entertainment and enjoyment of those who like solving puzzles and who like drawing. It is both new and unique for a drawing game. By drawing four lines to form a square and registering the square into four, separate positions upon an identical square containing an illustration within its center the lines of the illustration can be transferred into the square to resemble scrambled lines. To eliminate confusion of overlapping, scrambled lines a different color would be used for each group of lines transferred from each position in which the square is placed. Additional illustrations would be scrambled in a similar manner, assembled as a group on drawing board, reproduced on card stock with the lines divided into four different colors and cut so that a scrambled illustration would be displayed upon one side of a square card. These cards would become a component of the invention's apparatus.

Other components would include a holding panel, a pad of transparent paper, a drawing board, and a pen suitable for drawing. For unscrambling the illustrations the transparent paper pad is seated within a rectangular receptacle of the drawing board with the top of the pad facing the upper side of the receptical. The uppermost sheet of the paper pad is raised and the panel is inserted into the drawing board's receptacle so as to be positioned atop the paper pad and at the bottom side of the receptacle. A card containing one of the scrambled illustrations is placed, face up, into the panel's square receptacle so that the card is in its starting position. The uppermost sheet of the paper pad is laid across the panel and card for tracing the designated color of lines. The card is removed, turned counter-clockwise ninety degrees, and reinserted into the panel's receptacle for tracing the lines of a second color. After the square card has been placed in four 90 degree positions within the panel's square receptacle and the four sets of colored lines traced a duplicate of the original illustration is made.

The sheet of paper used in the tracing can be removed and a 2nd sheet raised from the pad for drawing a 2nd card containing another scrambled illustration. The group of cards, each with a different illustration, would provide hours of drawing fun.

For educational purposes some cards would be made through the scrambling of titles, names, captions, letters, numbers, and other visual matter with illustrations. These additions would help children to learn while drawing. Circular cut-outs would be used for two of the apparatus' components. They would expedite play of the game. A circular cut-out would be made along the upper side of the panel's square receptacle, at its center, for easy removal and repositioning of a card. A second circular cut-out would be made along the lower side of the drawing board's rectangular receptacle, at its center, for easy removal of the panel and paper pad. The use of a transparent paper pad was the preferred option for tracing the lines of the card's scrambled illustrations. The panel was designed to provide space between its upper side and the upper side of the board's receptacle so that the uppermost sheet of the paper pad would lay across the panel and its card and remain secure to the pad while the lines of a scrambled illustration are traced.

For further understanding of this invention reference may be had to the description below and to the accompanying figures in which:

FIG. 1 Illustrates in perspective view the card upon which the scrambled lines of an illustration are displayed.

FIG. 1 (a) Plan view of the card displaying a scrambled illustration. Illustration is that shown in FIG. 6.

Figure 1:
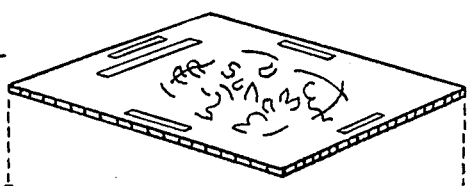

FIG. 6 A sample illustration shown prior to being scrambed and the way its duplicate would appear after unscrambling.

FIG. 7 Shows the four positions in which a card is placed within the panel's receptacle when unscrambling the card's scrambled lines.

FIG. 8 A perspective view of the apparatus while a drawing is being made from the card's scrambled lines.

FIG. 9 A perspective view of the apparatus when a drawing is completed and the sheet, upon which the drawing was made, is ready for removal.

FIG. 10 A perspective view of the apparatus showing a new sheet of paper raised from the pad and the panel being reinserted into the drawing board's receptacle for further drawing.

DETAILED DESCRIPTION OF INVENTION'S METHOD AND APPARATUS

For the method of scrambling illustrations in this invention four lines are drawn on illustration board to form a square. Two sides of the square are vertical and two sides are horizontal with the uppermost horizontal side becoming the top of the square. An illustration such as that shown in FIG. 6 is drawn within the square. An identical square is drawn upon tracing paper and registered upon the first square in four ninety degree positions and in a counter-clockwise direction. While the second square is in each of the four positions lines of the illustration are transferred into the second square. The four sets of lines transferred are each assigned a different color. When this process is completed all lines of the original illustration will have been transferred to the second square and will appear as scrambled lines 14. These lines would be reproduced in four colors upon card stock. Additional illustrations would be scrambled in the same manner and their lines separated into four different colors. These illustrations would be included in the reproduction with the original, scrambled illustration. The stock would be cut so that each scrambled illustration would be reproduced within a square card having identical dimensions to the original art. In addition to the scrambled illustration each card (FIGS. 1 and 1a) would display a title, name, caption, letters, numbers, or other visual matter pertaining to the illustration. For educational purposes some cards would have these figures scrambled with the illustrations. Each of the four sides of the square card would display a color name as indicated at 15, 16, 17 and 18, respectively, which would indicate the color of lines to be traced when that color name was in an upright position for tracing. The game title and copyright 20 for a work of art would also be displayed on the card, near its lower front side when the card is in its starting position. The card's illustration title 19 would be positioned above the scrambled lines when the card is in its starting position.

Figure 2:
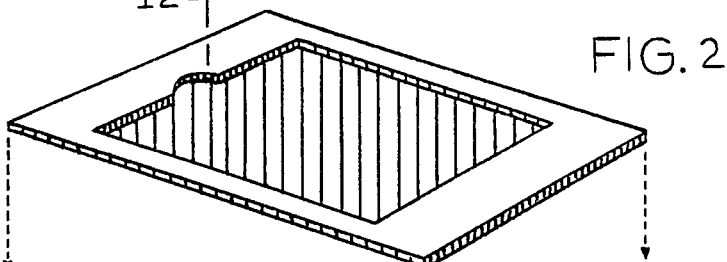
FIG. 2 Illustrates in perspective view the holding panel in which a card is positioned.
Figure 3:
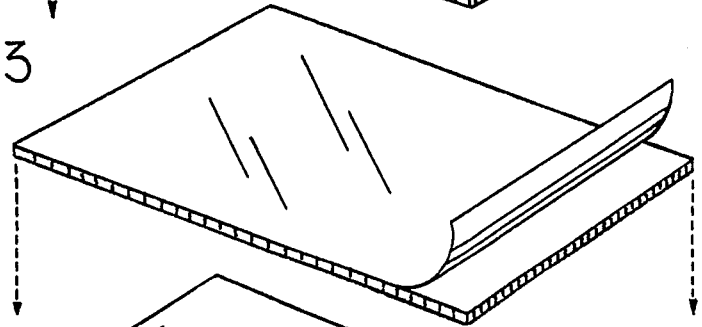
FIG. 3 Illustrates in perspective view the transparent paper pad used for tracing the card's scrambled illustrations.
Figure 4:
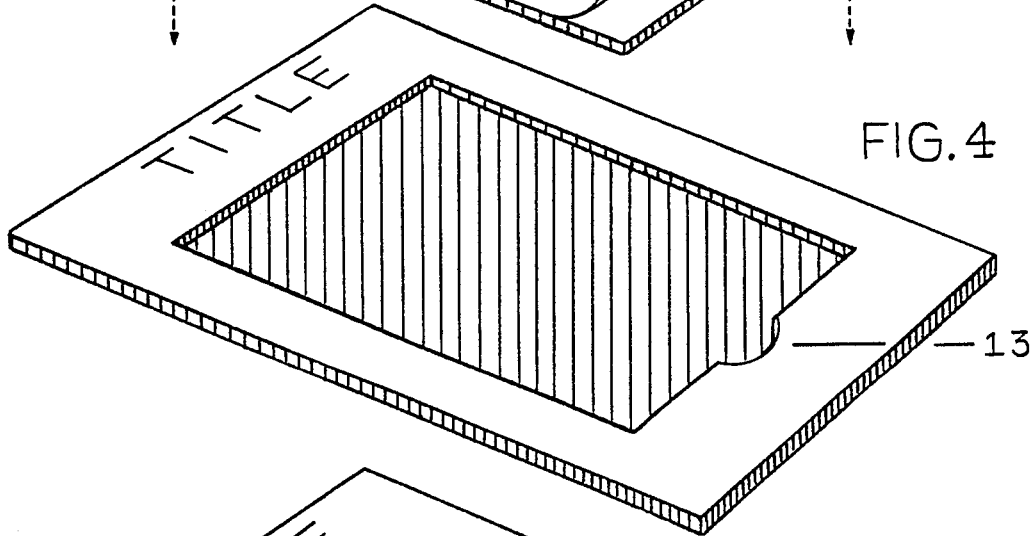
FIG. 4 Illustrates in perspective view the drawing board with its receptacle for holding the transparent paper pad and the panel.
Figure 5:
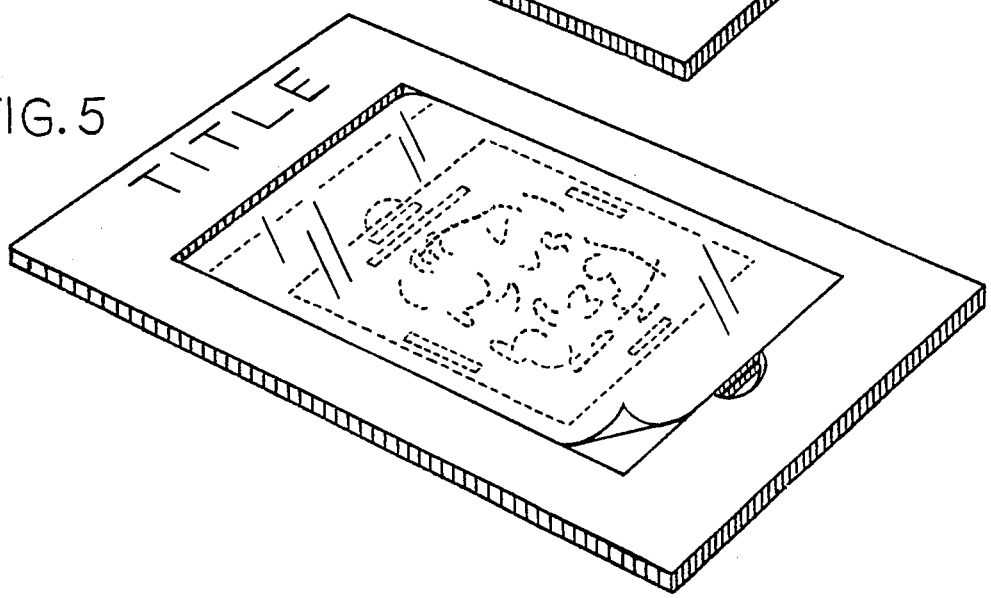
FIG. 5 Illustrates by perspective view the components of the invention's apparatus in position for drawing the card's scrambled illustration.

The unscrambling of illustrations in this invention is accomplished through the development and utilization of the four components of the invention's apparatus. The process for making the game cards has been described. Because each card would need to be placed into four positions as indicated at 21, 22, 23, and 24 respectively, in order to unscramble lines it would be a component of the invention's apparatus. Other components would include a holding panel (FIG. 2), a transparent paper pad (FIG. 3), a drawing board (FIG. 4), and a pen suitable for drawing.

The holding panel would be rectangular in shape with one of its shortest sides becoming the panel top and the other shortest side becoming the bottom of the panel. It would have a square receptical, with similar dimension as those of the square cards, within its center and the depth of the receptacle, from its base to the upper surface of the panel, would be equal to the thickness of a game card. The sides of the panel's receptacle would be vertical from its base and extending to the surface of the panel to firmly hold a game card. A circular cut-out 12 would be made along the upper side of the panel's receptacle, at its center, for easy removal and positioning of a game card. In addition to holding each of the cards the panel was developed to also provide space at its upper side which would permit the uppermost sheet of the paper pad to hold to the pad and yet lay across the panel and its card for the tracing of the card's scrambled lines. The panel would be made of plastic so that is receptacle and circular cut-out would be molded into the panel's body as one piece. Should cardboard be used in the panel's construction two sheets could utilized for this purpose. One sheet would be the front of the panel the other serving as its back. The sheet serving as the panel's front side would have its square receptical and circular cut-out die cut. The sheet serving as the back of the panel would also provide a base for the upper sheet's receptacle. The two sheets would be laminated together and cut to size.

The paper pad would be manufactured so as to firmly fit within the drawing board's rectangular receptacle. Its sheets would be transparent so that when a sheet was laid across one of the cards the scrambled lines would be visible for tracing. Each of the sheets would hold to the pad while a drawing was being made upon its upper side.

The drawing board would be rectangular in shape with one of its shortest sides becoming the top of the board and the other shortest side becoming the bottom of the board. Its dimensions would be 12" in height, 8½" in width, and ½" to 1" in depth. The drawing board would have a rectangular shaped receptacle within its front side with the receptacle's longest sides being parallel to the drawing board's longest sides. The receptacle would be centered between the board's two longest sides and nearly centered between the top and bottom sides of the drawing board. The receptacle would have a depth, from its base to the upper side of the board, equal to the combined thickness of the panel and paper pad so that when these two components are positioned within the receptacle the panel's front side would be flush with the board's front side. The receptacle's dimensions would be commensurate with those of the paper pad except for the depth, which would be as previously described. The sides of the receptacle would be vertical from the base to the front side of the drawing board so as to firmly hold the paper pad and panel. A circular cut-out 13 would be made along the lower side of the drawing board's receptacle, at its center, for easy removal of the panel and paper pad. The game's title would be displayed near the top of the drawing board and above the board's receptacle. The drawing board would be made of plastic so that the board, its receptacle, and its circular cut-out could be molded as one piece. If cardboard should be used in the board's construction one sheet would be made to serve as the front side of the board. The board's receptacle and circular cut-out would be die-cut within this sheet. A second sheet would serve as a back for the drawing board and as a base for the receptacle. The two sheets would be laminated together and cut to size.

The method's unscrambling process is accomplished by inserting the paper pad into the drawing board's receptacle and laying its uppermost sheet towards the top of the board. The panel is inserted into the board's receptacle, atop the paper pad, and positioned firmly against the bottom of the receptacle. A card, displaying a scrambled illustration, is placed into the panel's square receptacle so that the card's title 19 is positioned upright. This would be the card's starting position. The upper sheet of the paper pad would be laid across the panel and its card. The color of lines to be traced for that position would be displayed near the upper side of the card. After the designated color of lines are traced onto the sheet it is raised and the card is turned counterclockwise ninety degrees so as to place it into its second position within the receptacle. The sheet is laid across the panel and card and the second, designated color of lines are traced upon the sheet. This procedure is followed for the remaining two positions and at its conclusion a duplicate is made of the original illustration. The sheet containing the completed drawing could then be removed and a new sheet of paper, from the pad, be raised for insertion into the panel's receptacle after the first card has been removed. The sheet would be laid across the panel and its second card for unscrambling another illustration. The procedure would be followed for all of the remaining cards.

I claim:

1. A method of forming a scrambled illustration and of unscrambling the scrambled illustration comprising the steps of providing a square card, transposing a first plurality of lines in a first color from an illustration to the card when the card is in a predetermined orientation relative to the illustration, inscribing the name of the first color on the card so that the name is upright when the card is in said predetermined orientation, rotating the card 90 degrees with respect to the illustration and transposing a second plurality of lines in a second color from the illustration to the card, inscribing the name of the second color on the card such that the name is upright when the card has been rotated said 90 degrees, rotating the card a further 90 degrees in the same direction with respect to the illustration and transposing a third plurality of lines in a third color from the illustration to the card, inscribing the name of the third color on the card such that the name is upright when the card has been rotated said further 90 degrees, rotating the card an additional 90 degrees in the same direction with respect to the illustration and transposing a fourth plurality of lines in a fourth color to the card, and inscribing the name of the fourth color on the card such that the name is upright when the card has been rotated said additional 90 degrees, the first, second, third and fourth pluralities of lines comprising all of the lines constituting the illustration but in scrambled form, the illustration being unscrambled by providing a holding panel having a receptacle sized to receive said card, providing a pad of transparent paper sheets, providing a drawing board having a receptacle sized to receive said pad, disposing said pad in said drawing board receptacle, disposing said card in said holding panel receptacle, disposing said panel under the top sheet of said pad of sheets such that said colored lines on said card are visible through said top sheet, tracing on said sheet those lines which correspond in color to the name which is upright, removing the card from the holding panel, rotating it in 90 degree increments and tracing those lines on said top sheet which correspond in color to the color name which appears upright after each 90 degree rotation until the scrambled illustration on the card is recomposed in unscrambled form on the top sheet.

* * * * *